United States Patent Office 3,741,869
Patented June 26, 1973

3,741,869
PROCESS FOR THE PRODUCTION OF CITRIC ACID BY SUBMERGED FERMENTATION
Adel J. Kabil, Vienna, Austria, assignor to Aktiengesellschaft Jungbunzlauer Spiritus- und Chemische Fabrik, Schwarzenbergplatz, Austria
No Drawing. Filed May 24, 1971, Ser. No. 146,454
Claims priority, application Austria, June 1, 1970, 4,893/70
Int. Cl. C12d 1/04
U.S. Cl. 195—36 R                3 Claims

ABSTRACT OF THE DISCLOSURE

The invention relates to a process for the production of citric acid which comprises subjecting a partially decationized carbohydrate-containing solution to a submerged fermentation with a citric acid producing strain of *Aspergillus niger* in the presence of $K_4[Fe(CN)_6] \cdot 3H_2O$ as an inhibitor in an amount of less than 500 p.p.m.

---

The improvement according to the invention comprises adding in doses said inhibitor to said solution in a total amount of 0.05–10 p.p.m. in relation to the total amount of said solution at a pH value of less than 3.0.

The invention relates to a process for the production of citric acid which comprises subjecting a carbohydrate-containing solution to a fermentation with a citric acid producing strain of *Aspergillus niger* in the presence of $K_4[Fe(CN)_6] \cdot 3H_2O$ as an inhibitor in an amount of less than 500 p.p.m.

It is known that in order to obtain a high yield in citric-acid-producing mycelium of *Aspergillus niger*, the cell growth must be inhibited. By this inhibition, the cellular metabolism is guided in the direction of increased citric acid production.

An inhibition of cell growth is achieved by e.g. the addition of potassium ferrocyanide to the fermentation substrate. It is known that this addition above all, by the formation of complexes, inhibits all detrimental influences of metal ions on the citric acid production.

In a known process $K_4[Fe(CN)_6] \cdot 3H_2O$, a single addition of 500 to 4000 p.p.m. potassium ferrocyanide to the fermentation medium is effected, whereby this amount may optionally be increased or decreased. The disadvantage in this is that the single addition makes the control of mycelium growth impossible.

It is an object of the invention to provide a process in which the growth of the mycelium is inhibited in such a manner that substantially improved yields in citric acid are obtained.

According to the invention, the improvement comprises adding said inhibitor to said solution in doses in a total amount of 0.05–10 p.p.m. in relation to the total amount of said solution.

By the addition in doses, the mycelium growth is influenced in such a manner that an unexpected increase in capacity occurs so that the yield is increased and the fermentation period shortened.

It is of advantage to take care that the additions are effected at such times as make it seem necessary as a result of microscopic observation of mycelium growth. If the growth of mycelium is inhibited to a certain extent from the outset, less carbohydrate-containing material is used up for the formation of the mycelium, so that later on, more carbohydrate-containing material is available for citric acid production.

According to a preferred embodiment of the process according to the invention, the first dose of the inhibitor is added at the time of inoculation. In this, the mycelium growth is influenced from the outset in such a manner that citric acid production reaches an optimum value.

Preferably, the addition of the inhibitor is effected at a pH value of the carbohydrate-containing solution of less than 3.0.

If the growth of the mycelium is not sufficiently inhibited by the addition, further additions of $$K_4[Fe(CN)_6] \cdot 3H_2O$$

during the growth period are made until the desired inhibiting effect is achieved, but only up to a content of 10 p.p.m. $K_4[Fe(CN)_6] \cdot 3H_2O$ at the most in the fermentation mash. The inhibition of mycelium growth is kept under control by microscopic examination.

The following examples elucidate the process according to the invention and clearly show the differences between single addition and addition in doses.

EXAMPLE 1

12 l. of a partially decationised sugar solution with 25% sugar by weight per volume were adjusted to a pH value of 2.8 after the addition of nutrient salts, sterilised in streaming steam at 100° C., cooled off to 30° C. and put into a fermenter provided with a mechanical agitator and aeration under sterile conditions. The aerated and stirred solution was inoculated at a temperature of 30° C. with the spores of *Aspergillus niger* and kept at a fermentation temperature of 30° C. With the inoculation, one dose in an amount of 12 mg. of potassium hexacyanoferrate (II) was added to the fermentation solution. After a fermentation period of two weeks, an amount of 2247 g. of citric acid was obtained. This corresponds to a yield of 74.9% in relation to sugar.

EXAMPLE 2

To the fermentation solution treated according to Example 1, 3 mg. of potassium hexacyanoferrate were added at the time of inoculation. After a fermentation period of 11 days, an amount of 2703 g. of crystalline citric acid was obtained. This corresponds to a yield of 90.1% in relation to sugar.

EXAMPLE 3

The fermentation solution treated according to Examples 1 and 2 was adjusted to a pH value of 2.95 and inoculated with the spores of *Aspergillus niger*. The addition of the first dose of potassium hexacyanoferrate (II) was not effected until 20 hours after inoculation in an amount of 30 mg. Further additions of doses were made after microscopic observation, namely 6 mg. potassium hexacyanoferrate (II) on the fourth day and 3.6 mg. on the eighth day. After a fermentation period of 10 days, 2682 g. of crystalline citric acid were obtained, which corresponds to a yield of 89.4% in relation to sugar.

The following table gives the results in summarized form:

TABLE

| | | Addition of potassium hexacyanoferrate (II) in p.p.m. | | | | | | | |
|---|---|---|---|---|---|---|---|---|---|
| Ex. | Fermentation period in days | With inoculation | 20 hours after inoculation | 2d day | 4th day | 5th day | 7th day | 8th day | Citric acid yield in percent |
| 1 | 14 | 1 | | | | 0.35 | | 0.25 0.15 | 74.9 |
| 2 | 11 | 0.25 | | | | | | | 90.1 |
| 3 | 10 | | | 2.5 | | 0.50 | | 0.30 | 89.4 |

The examples show that an addition of potassium hexacyanoferrate (II) in doses substantially increases the yield in citric acid and that yields of 89.0% and more can be obtained at simultaneous shortening of the fermentation period, while in conventional methods of potassium hexacyanoferrate (II) treatment, yields of 70–75% at the most can be obtained.

I claim:
1. In a process for the production of citric acid which comprises subjecting a carbohydrate-containing solution, comprising at least partially decationized carbohydrates to a submerged fermentation with a citric acid producing strain of *Aspergillus niger* in the presence of

$$K_4[Fe(CN)_6] \cdot 3H_2O$$

as an inhibitor in an amount of less than 500 p.p.m., the improvement which comprises adding said inhibitor to said solution in doses in a total amount of 0.05–10 p.p.m. in relation to the total amount of said solution at a pH value of said solution of less than 3.0.

2. The process according to claim 2 wherein the first of said doses is added at the time of inoculation.

3. The process according to claim 2 wherein the first of said doses is added after inoculation.

References Cited
UNITED STATES PATENTS 3,118,821   1/1964   Clark _____ 195—36 R A. LOUIS MONACELL, Primary Examiner G. M. NATH, Assistant Examiner U.S. Cl. X.R.

195—37